(12) United States Patent
Lee (10) Patent No.: US 6,226,057 B1
(45) Date of Patent: May 1, 2001

(54) LIQUID CRYSTAL DISPLAY HAVING OVERLAPPED PIXEL ELECTRODES AND METHOD FOR FABRICATING THE SAME

(75) Inventor: Deuk Su Lee, Suwon (KR)

(73) Assignee: Hyundai Electronics Industries Co., Ltd., Ich'on (KR)

(*) Notice: Subject to any disclaimer, the term of this patent is extended or adjusted under 35 U.S.C. 154(b) by 0 days.

(21) Appl. No.: 09/061,053

(22) Filed: Apr. 16, 1998

(30) Foreign Application Priority Data

Apr. 18, 1997 (KR) .................................................. 97-14502

(51) Int. Cl.$^7$ ............................ G02F 1/1343; G02F 1/136
(52) U.S. Cl. ................................ 349/38; 349/43; 349/139
(58) Field of Search ................................ 349/38, 43, 139, 349/42

(56) References Cited

U.S. PATENT DOCUMENTS

| | | | |
|---|---|---|---|
| 5,151,806 | 9/1992 | Kawamoto et al. | 399/38 |
| 5,757,444 | * 5/1998 | Takemura | 349/38 |
| 6,011,600 | * 1/2000 | Kamada et al. | 349/43 |

* cited by examiner

*Primary Examiner*—Toan Ton
(74) *Attorney, Agent, or Firm*—Jacobson, Price, Holman & Stern, PLLC (57) ABSTRACT

Disclosed is a liquid crystal display which comprise: a transparent insulating substrate; a plurality of source bus lines and a plurality of gate bus lines arranged in rows and columns at right angles to each other on a surface of the transparent insulating substrate; a plurality of thin film transistors formed on the surface of the transparent insulating substrate, each connected to the source bus lines and the gate bus lines in the vicinity of their intersection and each comprising source, drain and gate electrodes; a plurality of pixel electrodes comprising first pixel electrodes and second pixel electrodes formed in alternative array at different level layers of upper and lower layers on the surface of the transparent insulating substrate from each other, and each connected to the drain electrode of the thin film transistors, wherein the first pixel electrodes are formed in even columns of the lower level layer and comprise first extended portions overlapped with at least the source bus lines at both sides thereof in the row direction, wherein the second pixel electrodes are formed in odd columns of the upper level layer and comprise second extended portions overlapped with at least the data lines at both sides thereof in the row direction; a first insulating layer disposed between the source bus lines and the first pixel electrodes; and a second insulating layer disposed between the first and second pixel electrodes.

20 Claims, 5 Drawing Sheets

LIQUID CRYSTAL DISPLAY HAVING OVERLAPPED PIXEL ELECTRODES AND METHOD FOR FABRICATING THE SAME

BACKGROUND OF THE INVENTION

The present invention relates generally to a liquid crystal display and a fabrication method thereof, and more particularly to a liquid crystal display having an overlaped structure that adjacent pixel electrodes with a dielectric interposed therebetween are overlapped each other.

Generally, color active matrix liquid crystal displays (AM-LCDs) with a fast response time, good display qualities, and a multiplicity of pixels, are expected to replace a the cathode ray tube. The AM-LCDs generally include an upper glass substrate, a lower glass substrate opposite the upper glass substrate, and liquid crystal layer interposed therebetween. On the lower glass substrate of these AM-LCDs are arranged a plurality of gate lines, a plurality of data lines crossed with the gate lines at right angle, and a plurality of switching elements such as thin film transistor or diode, each disposed in the vicinity of crossing points of the gate lines with the data lines. A plurality of pixel electrodes are also provided, each of which is connected with a corresponding one of the switching elements.

In most AM-LCDs, light transmittance is varied with alignment state of the liquid crystal molecules during the application of voltage to the pixel electrode. Therefore, images are displayed depending on the variation in the light transmittance. During the operation of AM-LCDs, so as to enhance the maintenance characteristic which maintain a voltage applied to the pixel electrode at a constant level, to stabilize gray scale, and to decrease flicker and residual image phenomena, storage capacitor is desirable for the AM-LCDs. For these purposes, storage on gate and storage on common modes were proposed and are both nowadays used. Storage on gate mode utilizes a portion of (n−1)-th gate line as an electrode for the storage capacitor corresponding to n-th pixel, while storage on common mode utilizes an additionally formed conductive line which is connected with the common electrode.

Proposed modes, however, cause drawbacks such as degeneration in aperture ratio, increase in delay time due to capacitance increase, and decrease in yield. In addition, they need an increase in operation capability of drive integrated circuit.

Figure 1A:
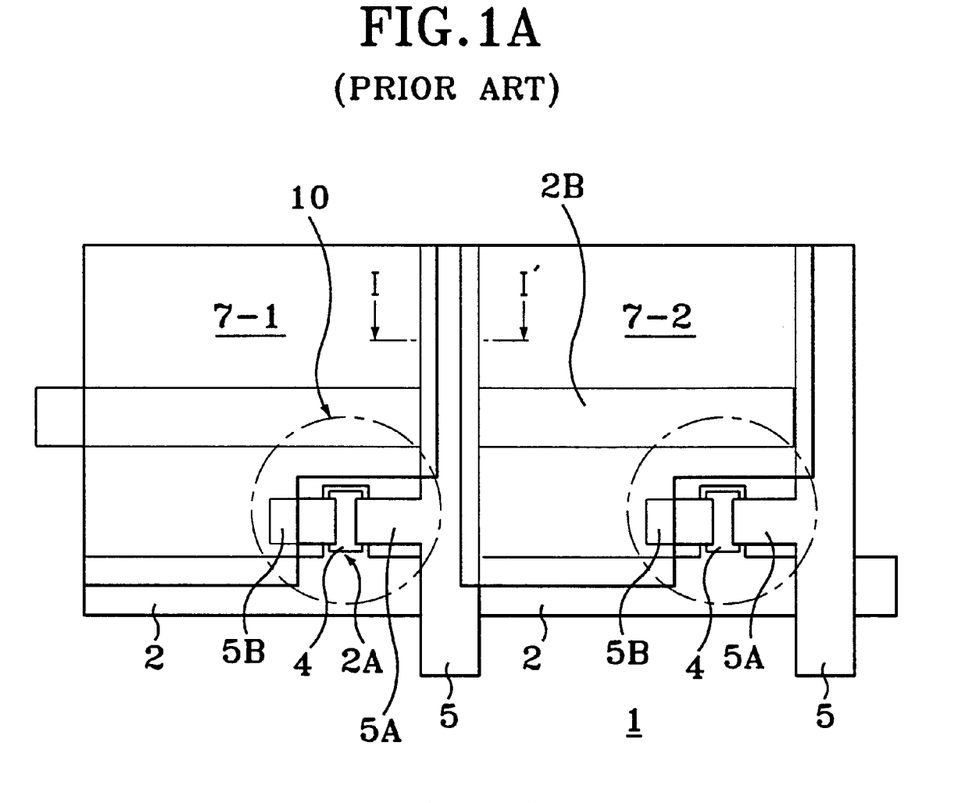
FIG. 1A is a partial plan view of a conventional liquid crystal display.
Figure 1B:
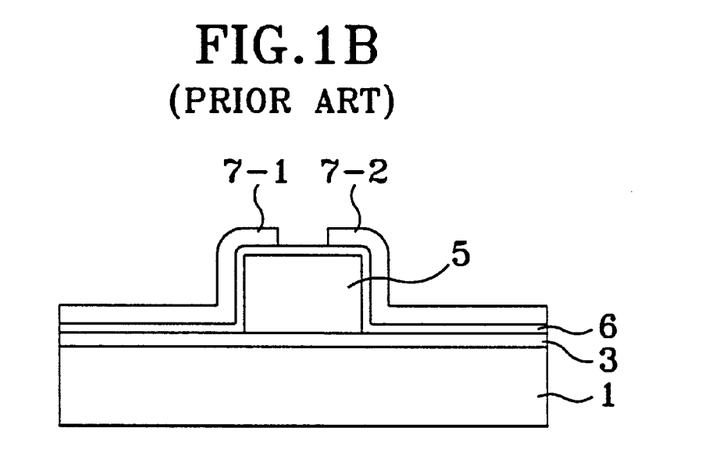
FIG. 1B is a sectional view taken along the line 1–1' of FIG. 1A.

FIG. 1A is a partial plan view of a conventional liquid crystal display device and FIG. 1B is a sectional view taken along the line I–I' of FIG. 1A.

Here, numeral 1 is an insulating substrate, 2 a gate line formed on the insulating substrate, 2A a gate electrode extended from, and being one body with the gate line 2, and 2B a storage capacitor electrode. Also, numeral 3 is a gate insulating layer, 5 a data line, 5A a source electrode, 5B a drain electrode, 6 a passivation layer, and 7-1 and 7-2 pixel electrodes respectively.

First, referring to FIG. 1A, over the insulating substrate 1, there are disposed the gate and date lines 2 and 5 with perpendicular cross. So as to prevent the shorting between the two lines, an insulating layer(not shown) is disposed therebetween. In the vicinity of the intersections of the gate line 2 with the data line 5, there is a thin film transistor 10 including the gate electrode 2A which is extended from the gate line 2, the source electrode 5A which is extended from the data line 5, the drain electrode 5B spaced apart, opposite the source electrode 5A and a channel layer 4. Here, the gate and data lines 2 and 5 function not only the coherent role to scan addressing signals and transfer data signals but an additional one to define unit cell. The drain electrodes 5B are electrically connected to the transparent pixel electrodes 7-1, 7-2 of indium thin oxide(ITO). And, along the row direction, in parallel to the gate bus line 2, there is disposed a storage electrode 2B for the storage common mode described above.

FIG. 1B is a sectional view taken along the line I–I' of FIG. 1A.

Referring to FIG. 1B, on the insulating substrate 1, there is disposed an insulating layer 3 which is provided for insulation between the gate line 2 and the data line 5 of FIG. 1A. The data lines 5 made of an opaque metal film are disposed on the insulating layer 3. So as to protect the thin film transistor shown in FIG. 1A, a passivation layer 6 is formed on portions including the thin film transistor and the data line 5. Over the passivation layer 6, there are arranged the pixel electrodes 7-1, 7-2 of ITO to be overlapped with selected portions of the data line 5. Here, overlap of the pixel electrodes 7-1, 7-2 and the date line 5 is for increasing the overall storage capacitance in proportional to the overlapped area, thereby enhancing the display quality.

However, the additional electrode 2B for storage capacitor has a still drawback to decrease the aperture ratio because it is overlapped with each pixel electrode by a selected portion and does not pass the incident light thereto from the back light source. In addition, since adjacent pixel electrodes are closely disposed to each other to such a degree that the width therebetween reaches about 10 μm, they may short to each other due to the fine pitch therebetween.

SUMMARY OF THE INVENTION

Therefore, an object of the present invention is to improve display quality without decreasing the aperture ratio.

Another object of the invention is to prevent the adjacent pixel electrodes from short-circuiting.

To accomplish the objects of the present invention, there is provided a liquid crystal display device which comprise: a transparent insulating substrate; a plurality of source bus lines and a plurality of gate bus lines arranged in rows and columns at right angles to each other on a surface of the transparent insulating substrate, wherein a pair of source bus lines and a pair of gate bus lines define a unit cell region; a plurality of thin film transistors formed on the surface of the transparent insulating substrate, each connected to the source bus lines and the gate bus lines in the vicinity of their intersection and each comprising source, drain and gate electrodes; a plurality of pixel electrodes comprising first pixel electrodes and second pixel electrodes formed in alternative array at different level layers of upper and lower layers on the surface of the transparent insulating substrate from each other, and each connected to the drain electrode of the thin film transistors, wherein the first pixel electrodes are formed in even columns of the lower level layer and comprise first extended portions overlapped with at least the data lines at both sides thereof in the row direction, wherein the second pixel electrodes are formed in odd columns of the upper level layer and comprise second extended portions overlapped with at least the source bus lines at both sides thereof in the row direction; a first insulating layer disposed between the source bus lines and the first pixel electrodes; and a second insulating layer disposed between the first and second pixel electrodes.

According to another aspect of the invention, a method for fabricating a liquid crystal display, comprising the steps of: providing a transparent insulating substrate on which a plurality of source bus lines and a plurality of gate bus lines for defining a plurality of unit pixel region each bounded by a pair of source bus lines and a pair of gate bus lines, and a plurality of thin film transistors connected to the source bus lines and gate bus lines, respectively are formed; forming a first insulating layer on the resultant substrate including at least the thin film transistors and the source bus lines; forming, at either odd or even columns, first pixel electrodes extended to both unit cell regions adjacent thereto in row direction beyond the source bus line at both sides thereof in the row direction; forming a second insulating layer on the resultant substrate including the first pixel electrode and the first insulating layer; and forming, at the remaining columns, second pixel electrodes extended to both unit cell areas adjacent thereto beyond the source bus lines at both sides thereof in the row direction.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS OF THE PRESENT INVENTION

Hereinafter, preferred embodiments will be described with reference to the accompanying drawings.

Figure 2A:
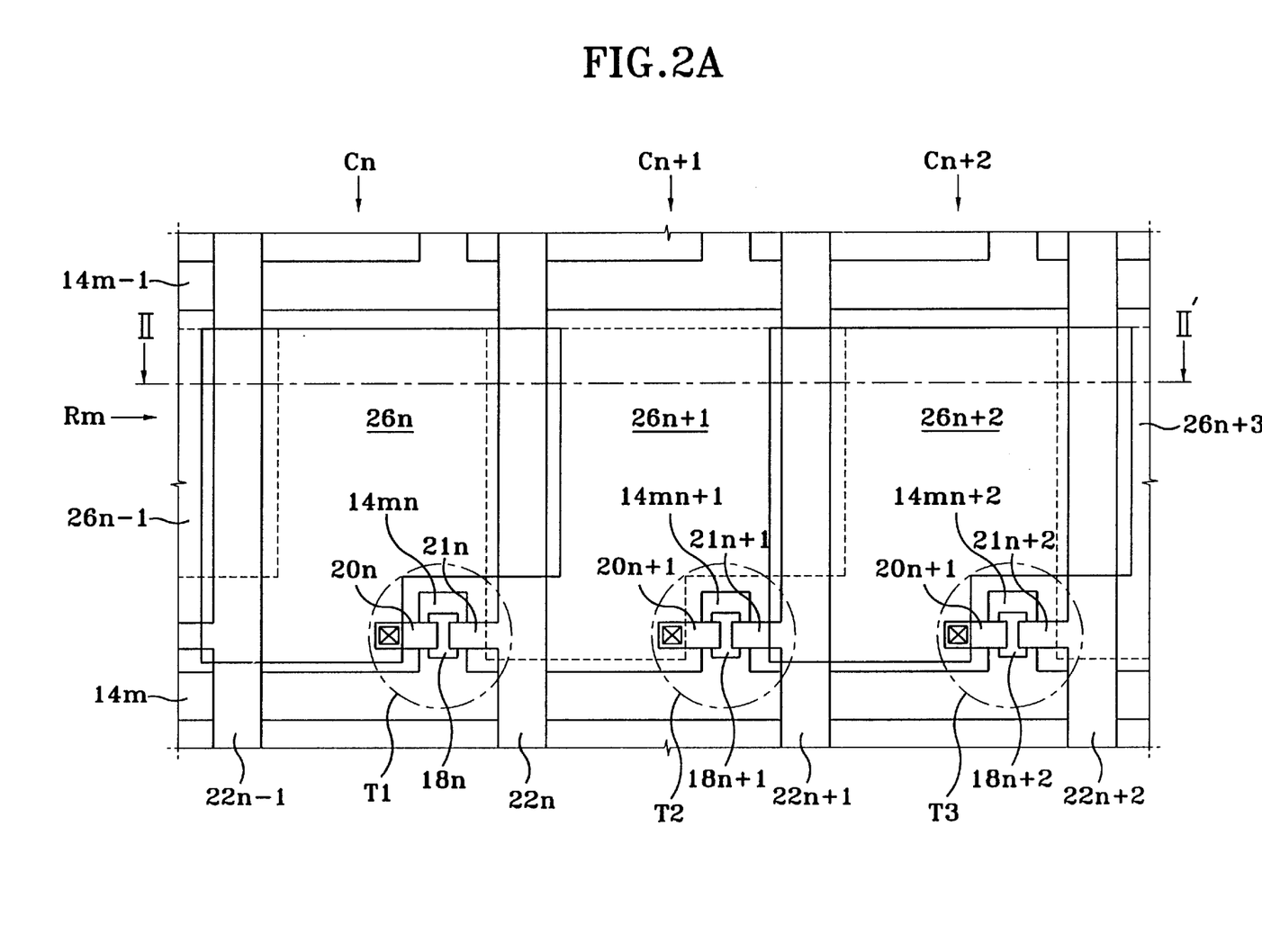
FIG. 2A is a partial plan view of a liquid crystal display according to a first embodiment of the present invention.
Figure 2B:
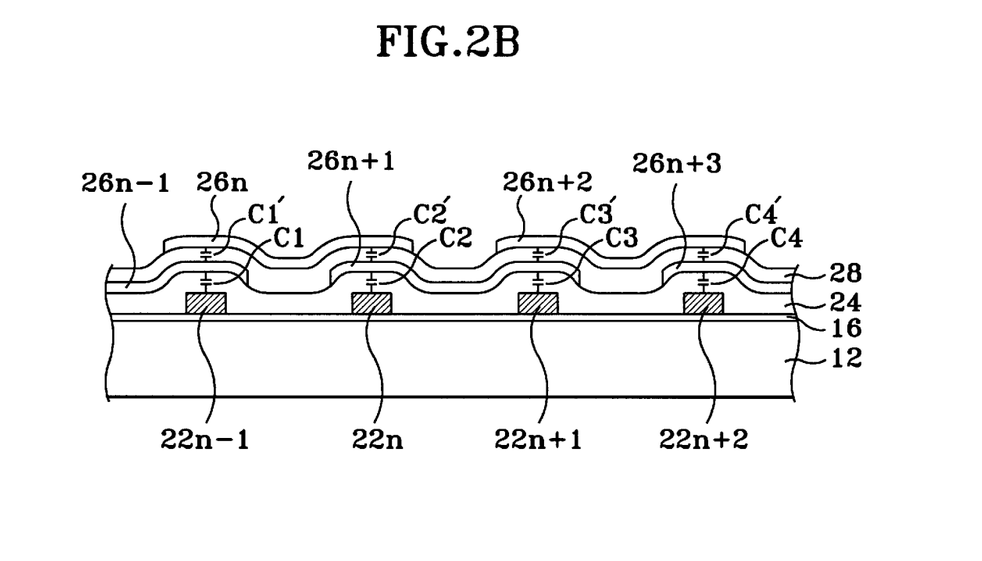
FIG. 2B is a sectional view taken along the line II–II' of FIG. 2A.

FIG. 2A is a partial plan view of a liquid crystal display in accordance with the present invention and FIG. 2B is a sectional view taken along the line II–II' of FIG. 2A.

In FIGS. 2A and 2B, numeral 12 indicates an insulating substrate, numerals 14$m$, 14$m$+1 gate bus lines formed on the insulating substrate 12, and numerals 14$mn$ and 14$mn$+1 gate electrodes which are respectively extended at right angle from the gate bus line 14$m$. Also, numeral 16 indicates a gate insulating layer, numerals 18$n$, 18$n$+1, 18$n$+2 channel layers formed on selected portions of the gate insulating layer 16; and numerals 22$n$−1, 22$n$, 22$n$+1, 22$n$+2 source bus lines. Numerals 21$n$, 21$n$+1, 21$n$+2 indicate source electrodes and numerals 20$n$, 20$n$+1, 20$n$+2 drain electrodes. Numeral 24 is a passivation layer(or first insulating layer). Numerals 26$n$, 26$n$+1, and 26$n$+2 indicate pixel electrodes respectively formed in unit cells. Lastly, numeral 28 indicates resin insulator(or second insulating layer).

First, referring to FIG. 2A, the plurality of source bus lines 22$n$−1, 22$n$, 22$n$+1, 22$n$+2 and the plurality of gate bus lines 14$m$, 14$m$+1 are arranged in a matrix configuration on the transparent insulating substrate(not shown in FIG. 2A) at regular intervals. Each of the source bus lines 22$n$−1, 22$n$, 22$n$+1, 22$n$+2 crosses with the gate bus lines 14$m$, 14$m$+1 in directions perpendicular to each other. Here, a pair of gate bus lines and a pair of source bus lines define unit cell(or unit pixel) region. In the vicinity of intersections of the source bus lines 22$n$−1, 22$n$, 22$n$+1, 22$n$+2 with the gate bus line 14$m$ corresponding thereto, there are disposed the source electrodes 21$n$, 21$n$+1, 21$n$+2 which are respectively extended from the source bus lines 22$n$−1, 22$n$, 22$n$+1, 22$n$+2 and the gate electrode 14$mn$, 14$mn$+1, 14$mn$+2 which are extended from the gate bus line 14$m$. The drain electrodes 20$n$, 20$n$+1, 20$n$+2 are disposed apart from the source electrode 21$n$, 21$n$+1, 21$n$+2 with a selected separation. Channel layers 18$n$, 18$n$+1, 18$n$+2 made of amorphous silicon containing hydrogen atoms are disposed on the corresponding gate electrodes 14$mn$, 14$mn$+1, 14$mn$+2 between the source electrodes 21$n$, 21$n$+1, 21$n$+2 and the drain electrodes 20$n$, 20$n$+1, 20$n$+2 opposite the source electrodes 21$n$, 21$n$+1, 21$n$+2. The thin film transistors T1, T2, T3 each includes the source electrodes 21$n$, 21$n$+1, 21$n$+2, the drain electrodes 20$n$, 20$n$+1, 20$n$+2 and the gate electrodes 14$mn$, 14mn+1, 14$mn$+2. Although not shown in the FIG. 2A, on the channel layers 18$n$, 18$n$+1, 18$n$+2 can be selectively disposed impurity-doped semiconductor layers so as to make ohmic contact with the source electrodes 21$n$, 21$n$+1, 21$n$+2 and drain electrodes 20$n$, 20$n$+1, 20$n$+2. The pixel electrodes 26$n$−1, 26$n$, 26$n$+1, 26$n$+2, 26$n$+3 made of indium tin oxide (ITO) are each formed in the unit cell region and adjacent portions thereof and then are connected to the drain electrodes 20$n$, 20$n$+1, 20$n$+2 of the corresponding thin film transistors T1, T2, T3. The pixel electrodes 26$n$−1, 26$n$, 26$n$+1, 26$n$+2, 26$n$+3 are each beyond the adjacent source bus lines arranged at left and right sides thereof and are then extended to edges of the adjacent pixel electrodes in row direction. The extension of the pixel electrodes 26$n$−1, 26$n$, 26$n$+1, 26$n$+2 shows that one pixel electrode is overlapped with both pixel electrodes and both data lines adjacent thereto in the row direction. Hereinafter, for the convenience in the description, column Cn+1 is referred to as even column and columns Cn and Cn+2 are referred to as odd column. And, the pixel electrode 26$n$+1 in the even column Cn is referred to as a first pixel electrode and pixel electrodes 26$n$, 26$n$+2 in the odd columns Cn, Cn+2 are referred to as a second electrode.

Hereinafter, there will be described a structure that the source bus lines and the first and second pixel electrodes in the even and odd columns are overlapped each other with reference to the accompanying drawing of FIG. 2B.

Referring to FIG. 2B, there is provided the transparent insulating substrate 12 with the gate insulator 16 formed thereon. Over the gate insulator 16 are arranged the source bus lines 22$n$−1, 22$n$, 22$n$+1, 22$n$+2 at a regular interval from each other. An insulating film(hereinafter referred to as a first dielectric film) 24 is formed over the resultant substrate 12 including the source bus lines 22$n$−1, 22$n$, 22$n$+1, 22$n$+2 and the gate insulator 16. Over the first dielectric film 24 are arranged the first pixel electrodes 26$n$−1, 26$n$+1, 26$n$+3. The first pixel electrodes 26$n$−1, 26$n$+1, 26$n$+3 are extended beyond the source bus lines 22$n$−1, 22$n$, 22$n$+1, 22$n$+2 at both sides thereof to both side edges of two adjacent pixel electrodes 26$n$, 26$n$+2 placed in the odd columns Cn, Cn+2. The first electrodes 26$n$−1, 26$n$+1, 26$n$+3 together with the underlying first dielectric film 24 and the source bus lines 22$n$−1, 22$n$, 22$n$+1, 22$n$+2 form first capacitors C1, C2, C3, C4. Over the resultant substrate 12 including the first pixel electrodes 26$n$−1, 26$n$+1, 26$n$+3 and the first dielctric film 24 is disposed another insulating film (hereinafter referred to as second dielectric film) 28. Over the second dielectric film 28 are arranged the second pixel electrodes 26*n*, 26*n*+2. The second pixel electrodes 26*n*, 26*n*+2 in the odd columns are also extended beyond the source bus lines 22*n*−1, 22*n*, 22*n*+1, 22*n*+2 to both side edges of the first pixel electrodes 26*n*−1, 26*n*+1, 26*n*+3 adjacent thereto along the row direction. Thus, the second pixel electrodes 26*n*, 26*n*+2, each of which extended portions forms second capacitors C1', C2', C3', C4' together with the underlying respective extended portions of the first pixel electrodes 26*n*−1, 26*n*+1, 26*n*+3 and the second dielectric film 28 interposed therebetween.

Although, in the first embodiment, the first pixel electrodes 26*n*−1, 26*n*+1, 26*n*+3 in the even columns are placed on the lower level layer and the second pixel electrodes 26*n*, 26*n*+2 in the odd columns are placed on the upper level layer, reverse structure thereof is also possible.

Figure 3:
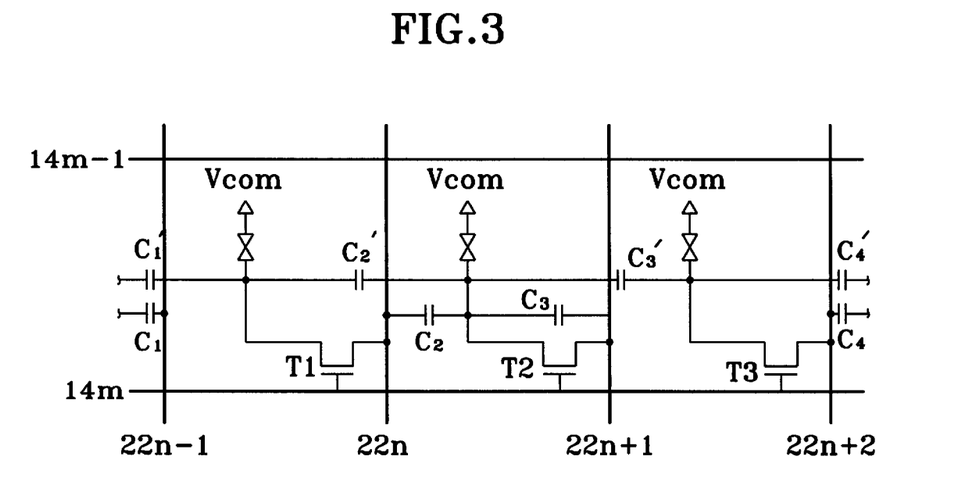
FIG. 3 is a equivalent circuit diagram of FIG. 2A.

FIG. 3 is an equivalent circuit of FIG. 2A.

Referring to FIGS. 2A, 2B, and 3, the thin film transistors T1, T2, T3 are each connected with the source bus lines 22*n*, 22*n*+1, 22*n*+2 and gate bus line 14*m* crossed with each other, and serve as switching element which are turned on or off depending gate signal applied to the gate bus line 14*m*, thereby to transmit data signals from the data lines 22*n*, 22*n*+1, 22*n*+2 to the pixel electrodes 26*n*, 26*n*+1, 26*n*+2. The drain electrode terminals of the thin film transistors T1, T2, T3, are coupled to liquid crystal capacitors $C_{LC}$, each of which is connected to Vcom terminals.

Referring to FIG. 2B and FIG. 3, for example, the first pixel electrode 26*n*+1, both sided edge portions extended in the row direction are connected to the first capacitors C2, C3 and also to the second capacitors C2', C3'. And, the second pixel electrodes 26*n*, 26*n*+2, each of which both sided edge portions extended in the row direction are connected to the second capacitors C1' and C2', C3' and C4'.

Thus, the first pixel electrodes 26*n*−1, 26*n*+1, 26*n*+3, each is connected to four capacitors and the second pixel electrodes 26*n*, 26*n*+2 each is connected to two capacitors. Accordingly, the first pixel electrodes 26*n*−1, 26*n*+1, 26*n*+3 each receives charges for maintaining a desired constant potential from the corresponding liquid crystal capacitor $C_{LC}$ and four capacitors while the second pixel electrode 26*n*, 26*n*+2 each receives charges for maintaining a desired constant potential from the corresponding liquid crystal capacitor $C_{LC}$ and two capacitors.

It is desirable for each unit pixel to maintain storage capacitance thereof at the same level. Then, the second capacitors C1', C2', C3', and C4' are each common to the first and second pixel electrodes and therefore a first capacitance for a corresponding one of the first pixel electrodes is larger than a second capacitance for a corresponding one of the second pixel electrode by sum of capacitances of two first capacitors. Accordingly, so as to minimize such a difference, a material having a smaller dielectric constant than the second dielectric film should be selected as the first dielectric film.

As a result, each of the pixel electrodes 26*n*+1, 26*n*, 26*n*+2 receives charges from two or four capacitors in addition to the liquid crystal capacitor $C_{LC}$ and therefore a liquid crystal display without degeneration in the display quality and decrease in the aperture ratio can be obtained.

Meanwhile, so as to prevent occurrence of a circumstance where capacitance for each unit pixel is not secured to a desired value by the first embodiment, there is need to provide additional capacitors.

Figure 4:
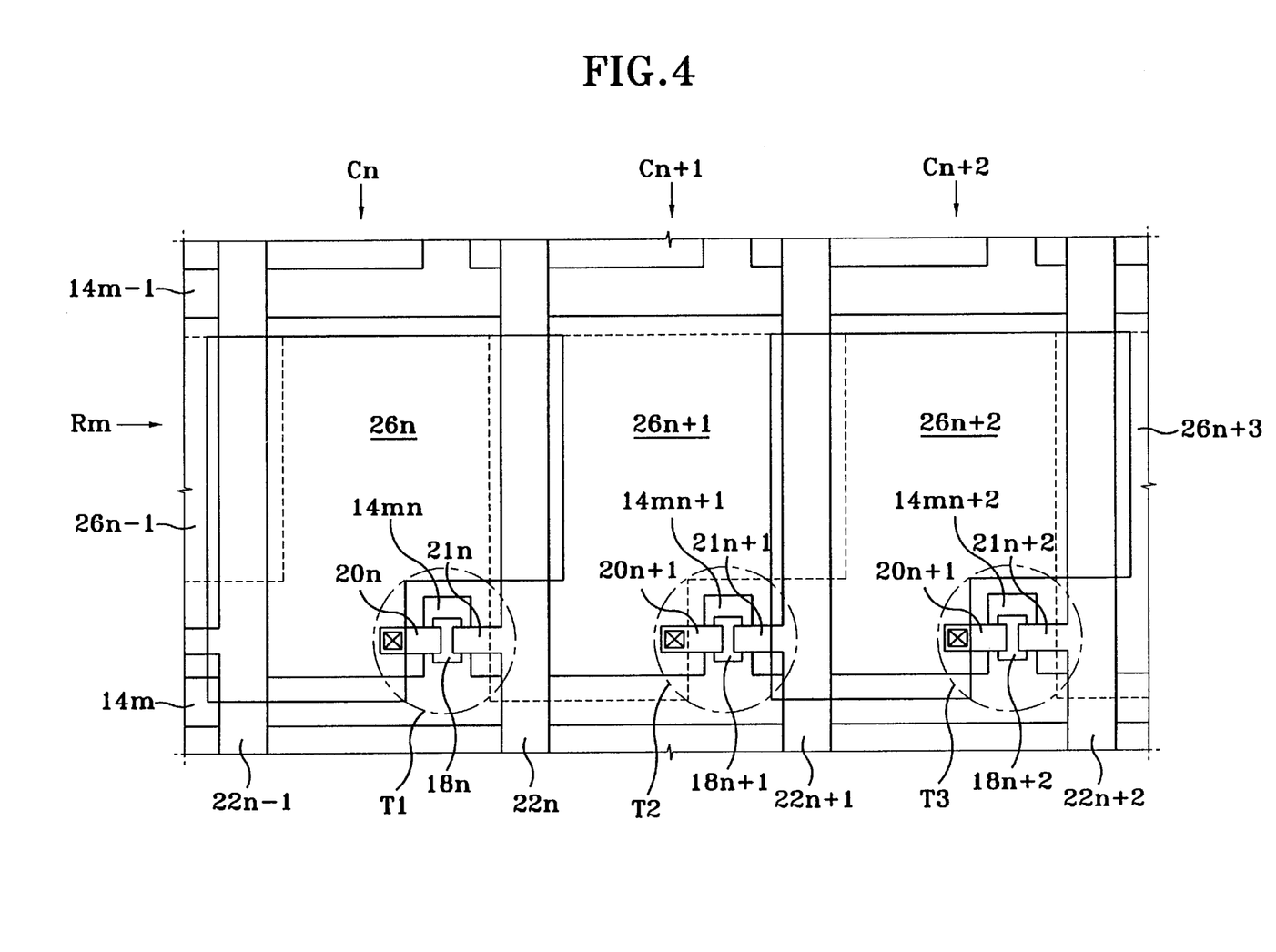
FIG. 4 is a partial plan view of a liquid crystal display according to a second embodiment of the present invention.

FIG. 4 is a partial plan view of a liquid crystal display in accordance with a second embodiment of the present invention.

As shown in FIG. 4, by extending pixel electrodes 26*n*, 26*n*+1, 26*n*+2 of each unit cell to a given position of surface of the corresponding gate line 14*m*, third capacitors are secured, which is formed by a combination of the pixel electrodes 26*n*, 26*n*+1, 26*n*+2, the corresponding gate line 14*m*, and insulator interposed therebetween. In this case, since the first pixel electrode 26*n*+1 in even column Cn+1 is placed at the lower level layer, e.g., on the first dielectric film, between the first pixel electrode 26*n*+1 and the gate line 14*m* corresponding to the first pixel electrode 26*n*+1, the first dielectric film is only interposed, while since the second pixel electrodes 26*n*, 26*n*+2 in odd columns Cn, Cn+2 are placed at the upper level layer, e.g., on the second dielectric film, between the second pixel electrodes 26*n*, 26*n*+2 and the underlying corresponding gate line 14*m*, both layers of the first and second dielectric films are interposed.

Capacitance of parallel plates capacitor is increased by making the area of the plates large and by making the separation between them small. Also, the capacitance of such parallel plates capacitor is proportional to dielectric constant of the dielectric film interposed therebetween.

Therefore, in case that the third capacitor described above in each unit cell has the same overlapped area, capacitance of the third capacitor becomes different from each other in even and odd columns. Then, if a capacitance difference between the third capacitors in each unit cell due to the different overlapped area exists and its value is large to such a degree that affects wrong on the normal operation of the liquid crystal display panel, the difference should be compensated.

So as to compensate the difference in capacitance, overlapped area between the pixel electrode and gate line in odd column and even column should be made different. Here, since the dielectric film in odd columns Cn, Cn+2 is thicker than that in even column Cn+1, it is desirable to make large the overlapped area between the pixel electrodes 26*n*, 26*n*+2 in the odd columns Cn, Cn+2 and the gate bus line.

It is also possible to selectively form the third capacitor at either one of odd or even column. In this case, as described in the first embodiment provided in FIGS. 2A, 2B, and 3, since the storage capacitance in the odd columns Cn, Cn+2 is smaller than that in the even column Cn, by extending only the pixel electrodes 26*n*, 26*n*+2 in the odd columns Cn, Cn+2 to be overlapped with the corresponding gate line 14*m*, total capacitance for each unit pixel can be maintained at the same value.

Figure 5:
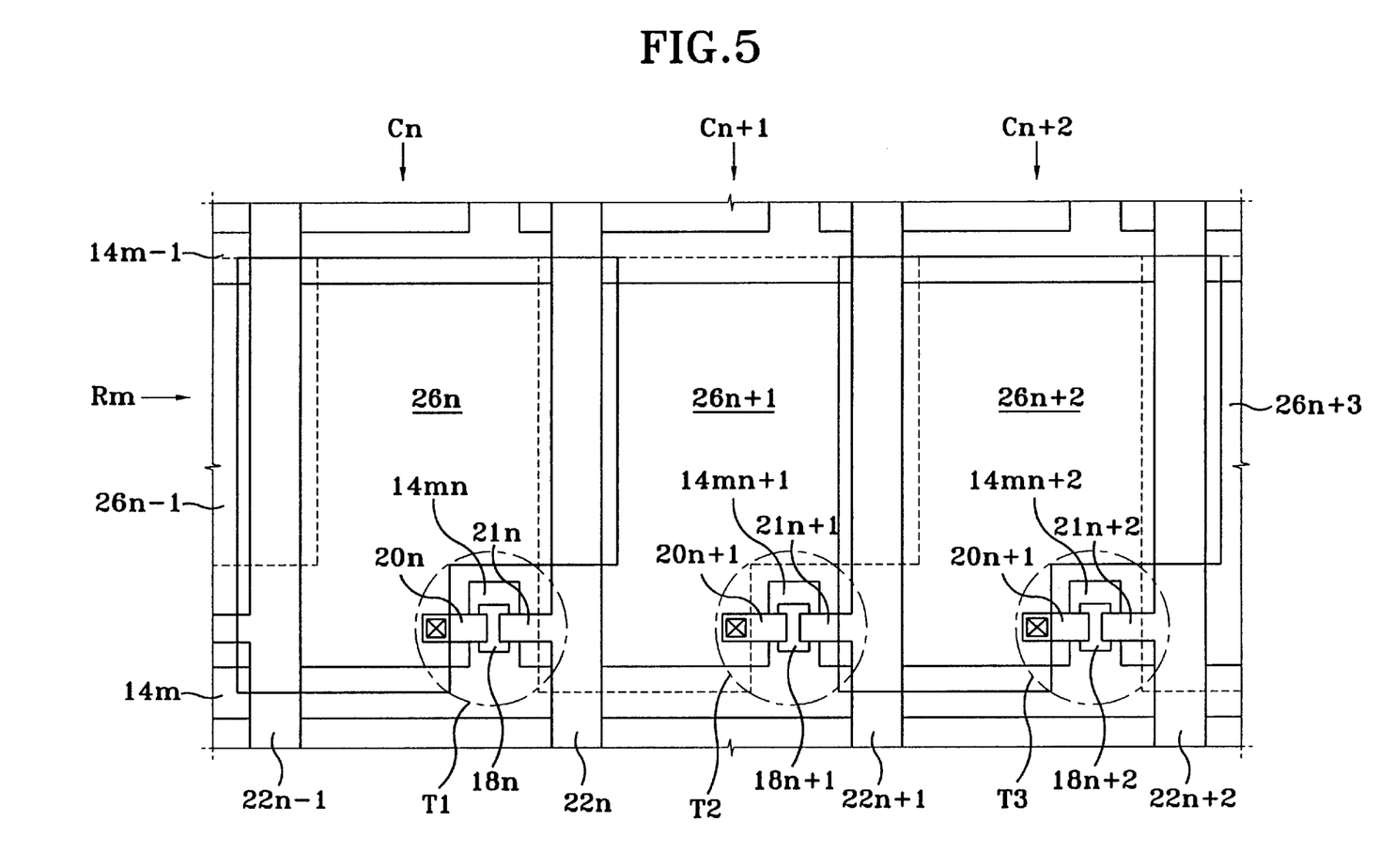
FIG. 5 is a partial plan view of a liquid crystal display according to a third embodiment of the present invention.

FIG. 5 is a partial plan view of a liquid crystal display in accordance with the third embodiment of the present invention, and shows a construction to secure another additional capacitor like the second embodiment.

As shown in FIG. 5, by extending upper and lower edges of the pixel electrodes 26*n*, 26*n*+1, 26*n*+2 of each unit cell to a given position of surface of the corresponding gate line 14*m* and to a given position of surface of a previous gate line 14*m*−1 for a corresponding pixel electrode of adjacent cell thereof, third and fourth capacitors are secured due to a combination structure of the pixel electrodes 26*n*, 26*n*+1, 26*n*+2, the gate lines 14*m*, 14*m*−1, and insulator interposed respectively therebetween. In this case, since the first pixel electrode 26*n*+1 in even column Cn+1 is placed at the lower level layer, e.g., on the first dielectric film, between the first pixel electrode 26*n*+1 and the corresponding gate line 14*m*, and between the first pixel electrode 26*n*+1 and the previous gate line 14*m*−1, only the first dielectric film is interposed, while since the second pixel electrodes 26*n*, 26*n*+2 in the odd columns Cn, Cn+2 are placed at the upper level layer, e.g., on the second dielectric film, between the second pixel electrodes 26n, 26n+2 and the underlying corresponding gate line 14m, and between the second pixel electrodes 26n, 26n+2 and the underlying previous gate line 14m−1, both layers of the first and second dielectric films exist.

Therefore, in case that the fourth capacitor in each unit cell has the same overlapped area, sum of capacitances of the third and fourth capacitors become different from each other in even and odd columns. Then, if a capacitance difference between sums of the third and fourth capacitors in each unit cell due to the aforementioned different overlapped area exists and its value is large to such a degree that affects wrong on the normal operation of the liquid crystal display panel, the difference should be compensated.

So as to compensate the aforementioned difference in capacitance, overlapped area between the pixel electrode and gate line in the odd columns Cn, Cn+2 and even column Cn+1 should be made different. Here, since the dielectric film in the odd columns Cn, Cn+2 is thicker than that in the even column Cn+1, it is desirable to make larger the overlapped area between the pixel electrode 26n+1 in the even column Cn+1 and the gate bus lines 14m, 14m−1.

Also, when sum of the capacitances of the first and second capacitors formed by the overlap of the pixel electrodes along the row direction is the same in each unit cell, it is desirable to additively form only a third capacitor in the even column Cn+1 and to additively form a third and fourth capacitors in the odd columns Cn, Cn+2, and vice verse. Therefore, the overlapped areas in odd and even columns should be controlled such that sum of the capacitances of the additional third and fourth capacitors is the same in odd and even columns.

Moreover, it is also possible to selectively form the third and fourth capacitors in either of the odd columns Cn, Cn+2 or even column Cn+1. In this case, as described in the first embodiment of FIGS. 2A, 2B, and 3, since the storage capacitance in the odd columns Cn, Cn+2 is smaller than that in the even column Cn+1, the total capacitance in each unit pixel can be maintained at the same value by extending only the second pixel electrodes in the even columns Cn, Cn+2 to be overlapped with the corresponding and previous gate lines 14m, 14m−1.

Thus, according to the above described embodiments, a sufficient capacitance can be secured with at least two or more capacitors, display quality without decrease in the aperture ratio is improved.

Hereinafter, a method for fabricating the liquid crystal display device according to the first embodiment of FIGS. 2A and 2B will be described.

Returning to FIGS. 2A and 2B, a transparent insulating substrate 12, for example, a glass substrate is provided. A conductor such as Cr is deposited on the glass substrate 12 and is then patterned to thereby form a plurality of gate bus lines 14m, 14m−1 shown in FIG. 2A. Thereafter, a gate insulating layer 16 is formed on the glass substrate 12 including the gate bus lines 14m, 14m−1. The gate insulating layer 16 has a comparatively good insulation characteristic compared with the conventional one. Next, although not shown in the drawings, a process for forming thin film transistors, for example, channel formation step, and impurities-doped silicon formation step, is performed. Here, the impurities-doped silicon formation step may be omitted according to kinds of the liquid crystal displays. Afterwards, on the gate insulating layer 16, there is deposited an opaque metal such as aluminum(Al) or titanium(Ti) or the like at a selected thickness. The deposited opaque metal is then patterned at regular intervals in perpendicular with the previously formed gate bus lines 14m, 14m−1. The source and drain electrodes of FIG. 2A are formed concurrently with the source bus lines 22n−1, 22n−1, 22n, 22n+1, 22n+2 during the patterning step for the formation of the source bus lines 22n−1, 22n, 22n+1, 22n+2. By completing the formation step of the source bus lines 22n−1, 22n, 22n+1, 22n+2, the thin film transistors T1, T2, T3 are substantially formed.

Thereafter, a passivation film 24 as a first dielectric film) for protecting the thin film transistors T1, T2, T3 is formed on the whole surface of the resultant substrate 12 including the source bus lines 22n−1, 22n, 22n+1, 22n+2 and the thin film transistors T1, T2, T3. Afterwards, indium tin oxide is deposited on the passivation film 24 at a selected thickness and is then patterned to thereby form the first pixel electrodes 26n−1, 26n+1, 26n+3 at unit cells of even columns. Here, during the patterning step, the first pixel electrodes 26n−1, 26n+1, 26n+3 have to be patterned such that they are overlapped with the source bus lines 22n−1, 22n, 22n+1, 22n+2 at left and right sides along a selected row, preferably to fully cover the source bus lines 22n−1, 22n, 22n+1, 22n+2.

Thereafter, resin insulator 28 as the second dielectric film is deposited on the resultant substrate 12 including the previously formed first pixel electrodes 26n−1, 26n+1, 26n+3 and the passivation film 24. The resin insulator 28 is for the insulation between the first pixel electrodes 26n−1, 26n+1, 26n+3 formed in the proceeding step and the second pixel electrodes 26n, 26n+2 that is to be formed in the succeeding step, which has a larger dielectric constant than the first dielectric film but has a comparatively small dielectric constant, for example 2–4, preferably 3. Afterwards, indium tin oxide is again deposited and then patterned to remain only in the odd columns, to thereby form the second pixel electrodes 26n, 26n+2. The second pixel electrodes 26n, 26n+2 have to be patterned such that they are overlapped with the source bus lines 22n−1, 22n, 22n+1, 22n+2 and the first pixel electrodes 26n−1, 26n+1, 26n+3 adjacent thereto in a selected row direction.

As a result of the aforementioned process, with respect to each of the source bus lines 22n−1, 22n, 22n+1, 22n+2, two capacitors, first and second capacitors are formed. The first capacitors C1, C2, C3, C4 are formed by a combination of the source bus lines 22n−1, 22n, 22n+1, 22n+2, the first pixel electrodes 26n−1, 26n+1, 26n+3, and the first dielectric film 24 interposed therebetween, and the second capacitors C1', C2', C3', C4' are formed by the first pixel electrodes 26n−1, 26n+1, 26n+3, the second pixel electrodes 26n, 26n+2, and the second dielectric film 28 interposed therebetween.

Meanwhile, methods for fabricating structures proposed in FIG. 4 and FIG. 5 are also performed by the same sequence as that of the above described method but the patterning steps for foming the first and second pixel electrodes 26n−1, 26n, 26n+1, 26n+2, 26n+3, are performed to be extended to their respective corresponding gate line 14m and previous gate line 14m−1 adjacent thereto in the upper direction.

Thus, according to the fabrication method described above, since the adjacent pixel electrodes in row direction are placed at different level layer from each other with insulator interposed therebetween, short-circuiting between the adjacent pixel electrodes can be prevent.

The present invention is not confined to the above mentioned embodiments. Although the present invention describes first forming the first pixel electrodes in even columns and then forming the second pixel electrodes in odd columns, it is possible to first form the pixel electrodes in odd columns and then to form the second pixel electrodes in even columns. Furthermore, although resin with the dielectric constant of 2–4 is used as the second dielectric film, another insulators can be selected. Morevoer, although the present embodiments show and describe that each of the extended portions of the pixel electrodes is extended to both sided edge portions of the adjacent pixel electrodes, the extended portions can be extended to a position where they are overlapped with at least the source bus lines at both sides of each of the pixel electrodes in the row direction.

Various other modifications will be apparent ot and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display comprising with overlapped pixel electrodes;
    a transparent insulating substrate;
    a plurality of source bus lines and a plurality of gate bus lines arranged in rows and columns at right angle to each other on a surface of the transparent insulating substrate, wherein a pair of source bus lines and a pair of gate bus lines define a unit cell region;
    a plurality of thin film transistors formed on a surface of the transparent insulating substrate, each connected to the source bus lines and the gate bus lines in a vicinity of their intersection and each comprising source, drain and gate electrodes;
    a plurality of pixel electrodes comprising first pixel electrodes and second pixel electrodes formed in alternative array at different level layers of upper and lower layers on the surface of the transparent insulating substrate from each other, and each of the first and second pixel electrodes connected to the drain electrode of a corresponding one of the thin film transistors, wherein the first pixel electrodes are formed in even columns of the lower level layer and comprise first extended portions overlapped with at least the plurality of source bus lines at both sides thereof in the row direction, wherein the second pixel electrodes are formed in odd columns of the upper level layer and comprise second extended portions overlapped with at least the plurality of source lines at both sides thereof in the row direction;
    a first insulating layer disposed between the source bus lines and the first extended portions of the first pixel electrodes; and
    a second insulating layer disposed between the first extended portions of the first pixel electrode and the second extended portions of the second pixel electrodes.

2. The liquid crystal display as claimed in claim 1, wherein the first and second extended portions each is extended to both sided edge portions of two pixel electrodes adjacent thereto in the row direction.

3. The liquid crystal display as claimed in claim 1, wherein the first and second pixel electrodes each further comprises a third extended portion overlapped with a corresponding one of the gate bus lines.

4. The liquid crystal display as claimed in claim 3, wherein the third extended portion has a different overlapped area from each other in the odd and even columns.

5. The liquid crystal display as claimed in claim 3, wherein the third extended portion has the same overlapped area in the odd and even columns.

6. The liquid crystal display as claimed in claim 3, wherein the third extended portion is formed in either the even or odd columns.

7. The liquid crystal display as claimed in claim 6, wherein the third extended portion is formed in the odd columns.

8. The liquid crystal display as claimed in claim 2, wherein the first and second pixel electrodes further comprises a fourth extended portion overlapped with a previous one of the gate bus lines.

9. The liquid crystal display as claimed in claim 8, wherein the fourth extended portion has a different overlapped portion in the odd and even columns.

10. The liquid crystal display as claimed in claim 8, wherein the fourth extended portion has the same overlapped area in the odd and even columns.

11. The liquid crystal display as claimed in claim 8, wherein the fourth extended portion is formed in either the odd or even columns.

12. The liquid crystal display as claimed in claim 1, wherein the first insulating layer is extended to upper surfaces of the thin film transistors such that it protects the thin film transistors.

13. The liquid crystal display as claimed in claim 1, further comprising a passivation layer for protecting the thin film transistors.

14. The liquid crystal display as claimed in claim 13, wherein said passivation layer is formed of the same material as the first insulating layer.

15. The liquid crystal display as claimed in claim 1, wherein a first overlapped area between the source bus line and the first pixel electrode, a second overlapped area between the first and second pixel electrodes, dielectric constants of the first insulating layer and the second insulating layer are determined such that total capacitance for a pixel electrode is the same as that for another pixel electrode.

16. The liquid crystal display as claimed in claim 1, wherein a dielectric constant of the second insulating layer is in the range of 2 to 4.

17. The liquid crystal display as claimed in claim 16, wherein said second insulating layer is formed of resin insulator.

18. The liquid crystal display as claimed in claim 1, wherein a dielectric constant of the second insulating layer is larger than that of the first insulating layer.

19. A method for fabricating a liquid crystal display, comprising the steps of:
    providing a transparent insulating substrate on which a plurality of source bus lines and a plurality of gate bus lines arranged in rows and columns at right angle to each other for defining a plurality of unit pixel region each bounded by a pair of source bus lines and a pair of gate bus lines, and a plurality of thin film transistors connected to the source bus lines and gate bus lines, respectively are formed, thereby forming a resultant structure;
    forming a first insulating layer on the resultant structure including at least the thin film transistors and the source bus lines;
    forming, at either odd or even columns, first pixel electrodes extended, to both unit cell regions adjacent thereto and beyond the source bus lines at both sides thereof, in the row direction;
    forming a second insulating layer on the resultant substrate including the first pixel electrode and the first insulating layer; and
    forming, at the remaining columns, second pixel electrodes extended, to both unit cell regions adjacent thereto and beyond the source bus lines at both sides thereof, in the row direction.

20. The method as claimed in claim 19, wherein the second insulating layer is made of resin having a dielectric constant of a range of 2 to 4.

* * * * *